US012583535B2

(12) United States Patent
　　　 Furukawa

(10) Patent No.: US 12,583,535 B2
(45) Date of Patent: Mar. 24, 2026

(54) VEHICLE REAR STRUCTURE

(71) Applicant: TOYOTA JIDOSHA KABUSHIKI KAISHA, Toyota (JP)

(72) Inventor: Tomoaki Furukawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 383 days.

(21) Appl. No.: 18/512,364

(22) Filed: Nov. 17, 2023

(65) Prior Publication Data

US 2024/0278859 A1　　Aug. 22, 2024

(30) Foreign Application Priority Data

Feb. 21, 2023　(JP) .................................. 2023-025349

(51) Int. Cl.
　　 *B62D 43/10*　　　(2006.01)
　　 *B62D 25/08*　　　(2006.01)
　　 *B62D 43/00*　　　(2006.01)
　　 *B62D 43/04*　　　(2006.01)

(52) U.S. Cl.
　　 CPC ............. *B62D 43/10* (2013.01); *B62D 25/08* (2013.01); *B62D 43/002* (2013.01); *B62D 43/04* (2013.01); *B62D 43/045* (2013.01)

(58) Field of Classification Search
　　 None
　　 See application file for complete search history.

(56) References Cited

U.S. PATENT DOCUMENTS

| | | | | |
|---|---|---|---|---|
| 1,494,657 A * | 5/1924 | Whitton | ................. | B62D 43/04 |
| | | | | 296/37.2 |
| 1,983,767 A * | 12/1934 | Mueller | ............... | B62D 43/045 |
| | | | | 414/463 |
| 3,879,058 A * | 4/1975 | Horn | .................... | B62D 43/002 |
| | | | | 414/466 |
| 4,718,693 A * | 1/1988 | Booher | .................. | B60G 11/44 |
| | | | | 267/149 |
| 2021/0107574 A1 | 4/2021 | Okamura et al. | | |
| 2022/0185396 A1 * | 6/2022 | Shaner | ................... | B62D 25/20 |

FOREIGN PATENT DOCUMENTS

| | | |
|---|---|---|
| JP | 2007-276605 A | 10/2007 |
| JP | 2018-127023 A | 8/2018 |
| JP | 2021-062784 A | 4/2021 |

* cited by examiner

*Primary Examiner* — Joseph D. Pape
(74) *Attorney, Agent, or Firm* — SoraIP, Inc.

(57) ABSTRACT

The framework includes a pair of right and left side frames extending in the longitudinal direction of the vehicle, a second cross member connected to the rear portions of the side frames so as to bridge along the lateral direction of the vehicle and supporting the rear portion of the motor, and the side frames. A third cross member is connected to the rear of the second cross member so as to bridge along the right-left direction of the vehicle, and detachably supports the spare tire so as to hang it. The third cross member is formed in an inverted U shape, has a spare tire lifting device in the middle in the longitudinal direction, and has attachment portions to which the rear ends of the leaf springs are attached at one end side and the other longitudinal end side of the third cross member.

3 Claims, 6 Drawing Sheets

VEHICLE REAR STRUCTURE

CROSS-REFERENCE TO RELATED APPLICATION

This application claims priority to Japanese Patent Application No. 2023-025349 filed on Feb. 21, 2023 incorporated herein by reference in its entirety.

BACKGROUND

1. Technical Field

The present disclosure relates to a vehicle rear structure.

2. Description of Related Art

For example, Japanese Unexamined Patent Application Publication No. 2021-62784 (JP 2021-62784 A) describes "a motor 16 is supported under a rear floor panel 40 of an electrified vehicle 10, a spare tire 24 is supported behind the motor 16 in a vehicle front-rear direction above the rear floor panel 40 of the electrified vehicle 10, and the spare tire 24 is supported by a brace 30 fixed to a body 12."

SUMMARY

JP 2021-62784 A discloses a structure in which a motor and a spare tire are arranged at the rear portion of a vehicle, and the spare tire is placed on a rear floor panel, and a technical idea in which the spare tire is supported to be suspended under a side frame and a cross member is not known.

In view of such circumstances, it is an object of the present disclosure to provide a vehicle rear structure capable of improving the rigidity of a rear portion of a frame of the vehicle while allowing a spare tire to be suspended and supported under the rear portion of the frame of the vehicle.

The present disclosure provides a vehicle rear structure in which a motor that generates a driving force is supported under a rear portion of a frame of a vehicle, and a spare tire is supported behind the motor in a vehicle front-rear direction. The frame includes a pair of right and left side frames extending in the vehicle front-rear direction, a front cross member that is connected to rear portions of the side frames such that the front cross member spans along a vehicle right-left direction and supports a rear portion of the motor, and a rear cross member that is connected to portions of the side frame such that the rear cross member spans along the vehicle right-left direction behind the front cross member in the vehicle front-rear direction and detachably supports the spare tire. The rear cross member is inverted U-shaped, is provided with a support device for the spare tire in a middle of the rear cross member in a longitudinal direction of the rear cross member, and is provided with attachment portions to each of which a rear end of a leaf spring is attached, the attachment portions being provided in one end side and another end side of the rear cross member in the longitudinal direction.

As described above, in the present disclosure, by installing the front cross member for supporting the motor and the rear cross member for supporting the spare tire at the rear portion of the frame of the vehicle, a configuration is adopted in which the motor and the spare tire are disposed densely in the vehicle front-rear direction under the rear portion of the frame of the vehicle, and the rear ends of the leaf springs are attached to the attachment portions of the cross member.

According to this configuration, the rigidity of the rear portion of the frame of the vehicle is improved compared to a conventional example in which the motor is supported under the frame of the vehicle and the spare tire is mounted on the floor panel.

As a result, the support rigidity of a load input from right and left rear wheels and the torsional rigidity of the rear portion of the frame of the vehicle are improved. Therefore, noise and vibration (NV) characteristics can be reduced, the function of the leaf springs can be exhibited stably, and maneuverability can be improved.

In the above vehicle rear structure, the one end side and the other end side of the rear cross member in the longitudinal direction may be bent such that the one end side and the other end side protrude below the respective side frames, and the attachment portions may be configured to include protruding portions on the one end side and the other end side of the rear cross member, and shackles attached to the respective protruding portions.

According to this configuration, when another vehicle collides with the rear portion of the vehicle or when the rear portion of the vehicle collides with any object, even in a situation where the other vehicle or the object enters the lower side of the rear portion of the side frame, the other vehicle and the object are received by the spare tire and the attachment portions (the projecting portions and the shackles) on the one end side and the other end side of the rear cross member in the longitudinal direction.

As a result, it is possible to suppress or prevent the other vehicle or the object from entering the lower side of the side frame at the rear portion of the vehicle.

In addition, in the above vehicle rear structure, a width of each of one end side and another end side of the front cross member in an longitudinal direction of the front cross member may be set to be larger than a width of the other portion of the front cross member, and a width of each of a bent portion on the one end side and a bent portion on the other end side of the rear cross member may be set to be larger than a width of the other portion of the rear cross member.

According to this configuration, the rigidity of the connecting portions between the front cross member and the side frames and between the rear cross member and the side frames is improved.

As a result, the support rigidity of a load input from the right and left rear wheels and the torsional rigidity of the rear portion of the frame of the vehicle are further improved. This contributes to a further reduction of the NV characteristics and a further improvement in maneuverability as the function of the leaf springs can be exhibited stably.

According to this disclosure, it is possible to provide a vehicle rear structure that allows a motor and a spare tire to be disposed under a rear portion of a frame of a vehicle while allowing the rigidity of the rear portion of the frame to be improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an ideal embodiment for carrying out the disclosure is described in detail with reference to the drawings.

FIGS. 1 to 6 show an embodiment of the disclosure. In the figure, the vehicle rearward direction is "Rr", the vehicle upward direction is "Up", the vehicle leftward direction is "Lh", and the vehicle rightward direction is "Rh".

A motor 1 that generates driving force for the vehicle is supported on the lower side of the rear portion of the vehicle frame. A driving force generated by the motor 1 is transmitted to the right and left rear hubs 7 via the right and left axles 6. The right and left rear hubs 7 are connected by a De Dion tube (axle) 8.

Figure 4A:
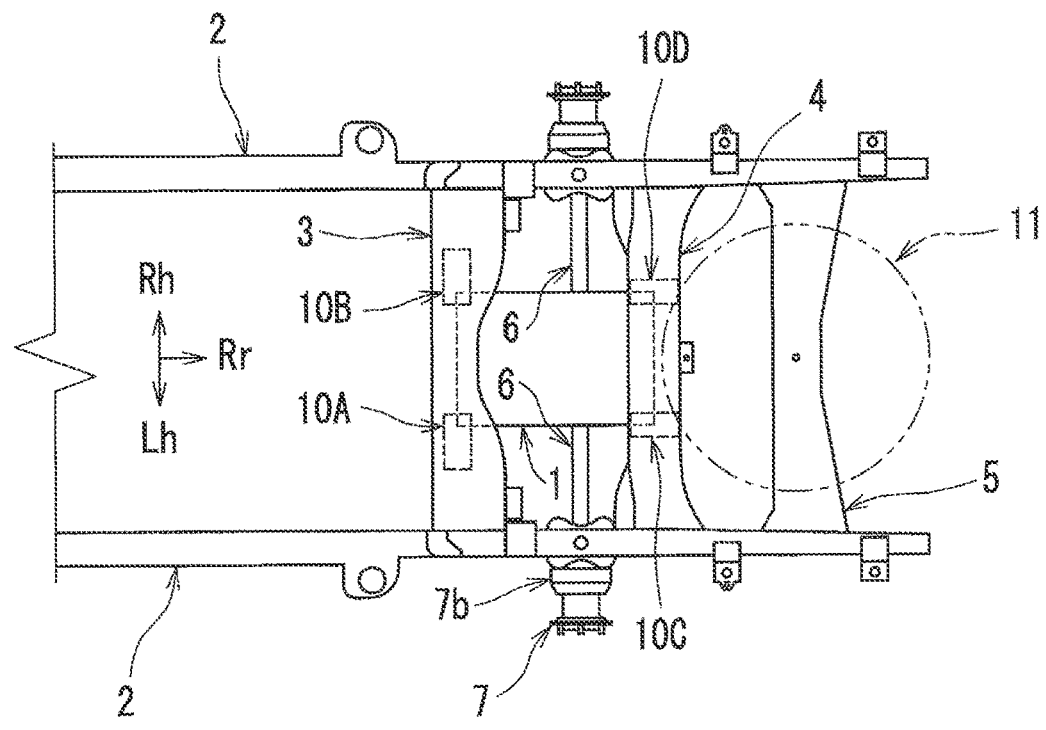
FIG. 4A is a plan view of the vehicle rear structure.
Figure 4B:
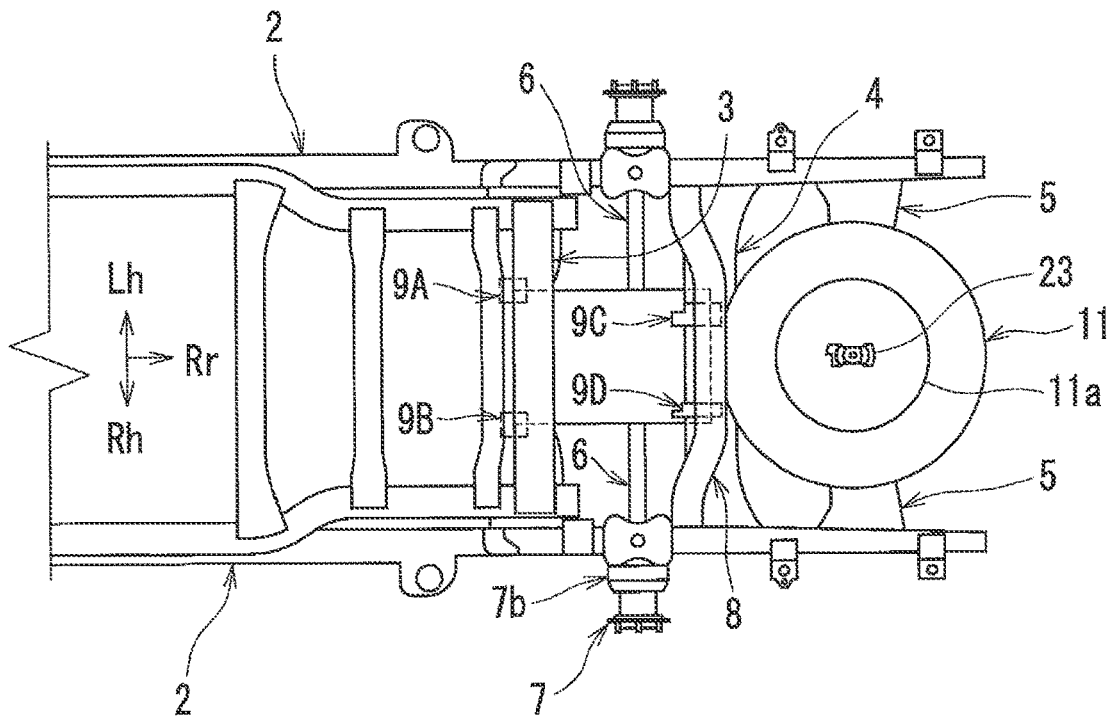
FIG. 4B is a bottom view of the vehicle rear structure.

The frame of the vehicle includes at least a pair of right and left side frames 2, a first cross member 3, a second cross member 4, a third cross member 5, and the like, as shown in FIGS. 4A and 4B, for example.

The side frames 2 are arranged along the longitudinal direction of the vehicle. The first cross member 3, the second cross member 4, and the third cross member 5 are connected to the side frames 2 so as to span along the vehicle right-left direction and to be separated from each other in the vehicle front-rear direction.

The side frames 2, the first cross member 3, the second cross member 4 and the third cross member 5 are made of, for example, a metal material or the like and are hollow.

The first cross member 3 is arranged at a predetermined position forward of the motor 1 on the side frames 2. The second cross member 4 and the third cross member 5 are arranged behind the motor 1 in the side frames 2.

The first cross member 3 has a band-like shape in a plan view, and supports the front portion of the motor 1 in the middle in the longitudinal direction. One end side and the other end side of the first cross member 3 in the longitudinal direction are connected to the inner surfaces of the side frames 2 by, for example, welding.

Specifically, as shown in FIGS. 1 to 6, front motor mounts 9A and 9B are attached to the front portion of the motor 1 at two locations in the right-left direction of the vehicle. On the other hand, front brackets 10A and 10B are attached to the first cross member 3 at two locations in the middle in the longitudinal direction. Front motor mounts 9A, 9B are connected to front brackets 10A, 10B.

The second cross member 4 has a belt-like shape in a plan view, and supports the rear portion of the motor 1 in the middle in the longitudinal direction. One end side and the other end side of the second cross member 4 in the longitudinal direction are connected to the inner surfaces of the side frames 2, for example, by welding. This second cross member 4 corresponds to the "front cross member" recited in the claims.

Specifically, as shown in FIGS. 1 to 6, rear motor mounts 9C and 9D are attached to the rear portion of the motor 1 at two locations in the right-left direction of the vehicle. On the other hand, rear brackets 10C and 10D are attached to the second cross member 4 at two locations in the middle in the longitudinal direction. Rear motor mounts 9C, 9D are connected to rear brackets 10C, 10D.

The third cross member 5 is formed in an inverted U shape when viewed from the rear, and a bent portion on one longitudinal end side and a bent portion on the other longitudinal end side are connected to the inner surface of the side frames 2 by, for example, welding. One end side and the other end side in the longitudinal direction protrude below the side frames 2.

A rear end of a leaf spring 13 is attached via a shackle 12 to a projecting portion 5a on one end side and a projecting portion 5b on the other end side of the third cross member 5 in the longitudinal direction. A front end of the leaf spring 13 is supported by the side frame 2.

A rear hub 7 is attached to the middle upper portion of the leaf spring 13 in the longitudinal direction via first and second hub carriers 7a and 7b. A shock absorber 14 is attached between the longitudinal middle of the leaf spring 13 and the first cross member 3.

The projecting portion 5a on one end side of the third cross member 5, the projecting portion 5b on the other end side, and the shackle 12 attached to each of the projecting portions 5a and 5b corresponds to the "mounting portion" described in the scope of claims.

As is well known, the shackle 12 is a metal fitting used to attach the leaf spring 13 to the frame of the vehicle body.

A spare tire 11 is detachably suspended from the middle of the third cross member 5 in the longitudinal direction via a lifting device 20. The third cross member 5 corresponds to the "rear cross member" recited in the claims, and the lifting device 20 corresponds to the "support device" recited in the claims.

Figure 5A:
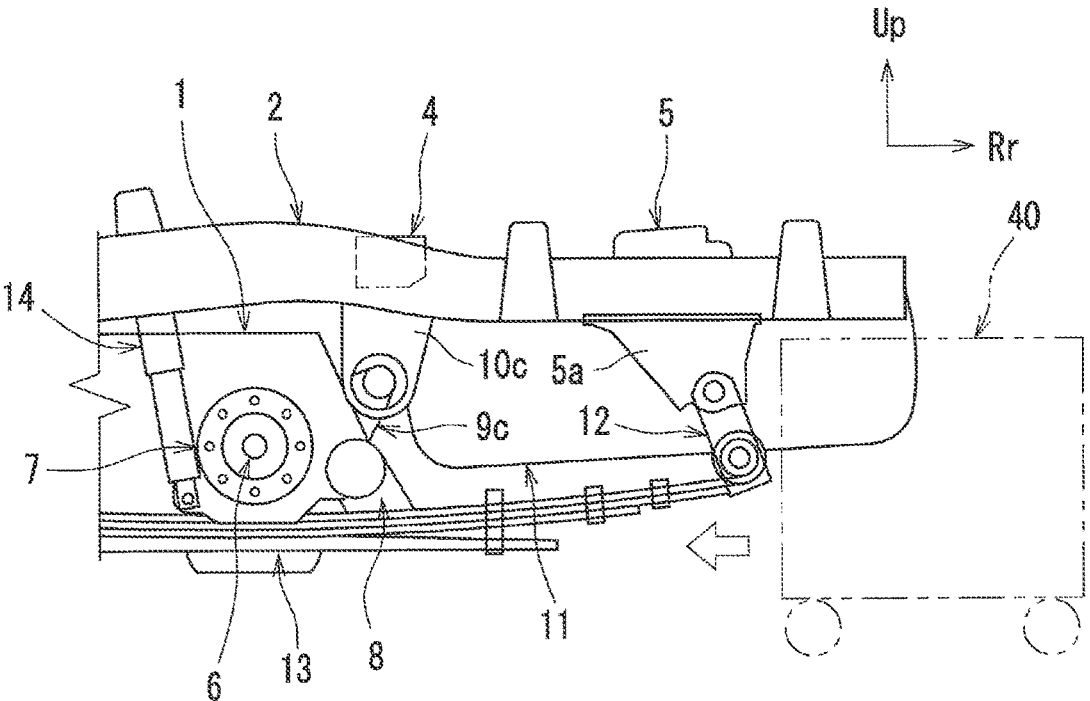
FIG. 5A is a left side view of the vehicle rear structure.
Figure 5B:
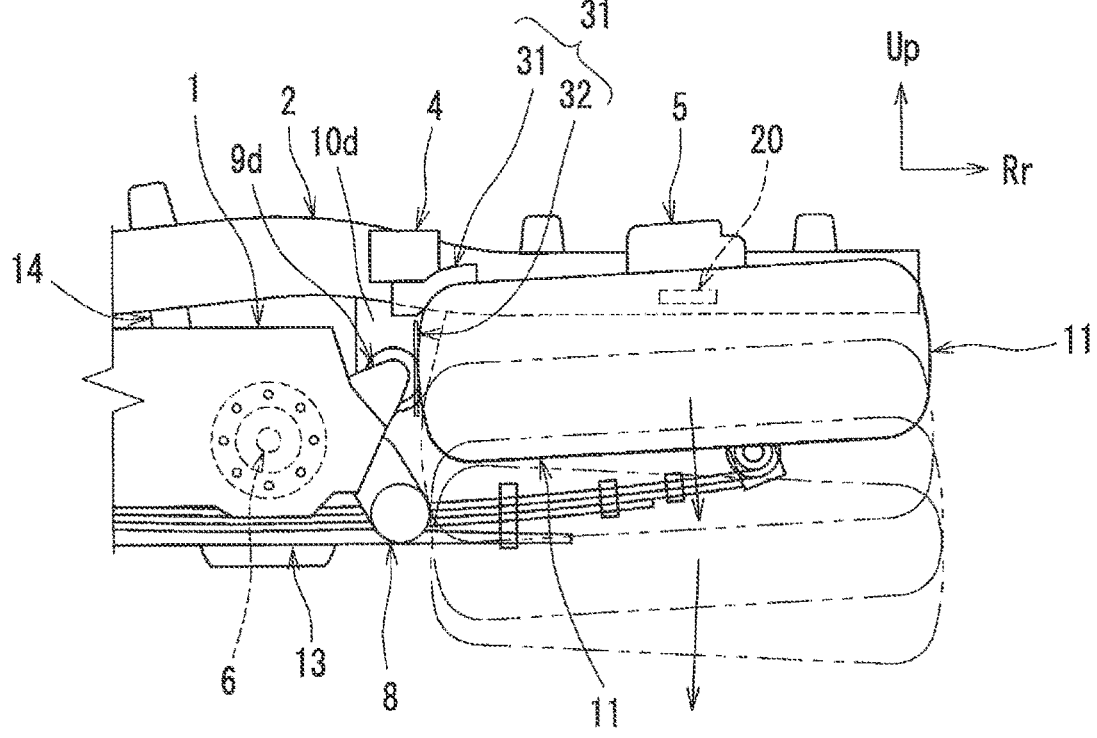
FIG. 5B is a schematic cross-sectional view along the vehicle front-rear direction at the center in the vehicle right-left direction.

As is well known, the spare tire 11 is supported by the third cross member 5 so as to be in a lateral position with its front side lowered corresponding to the departure angle, as shown in FIGS. 5A and 5B. The forward-downward lateral orientation means that the inclination of the center axis (rotational axis) of the spare tire 11 with respect to the vertical line is less than 45 degrees.

Figure 1:
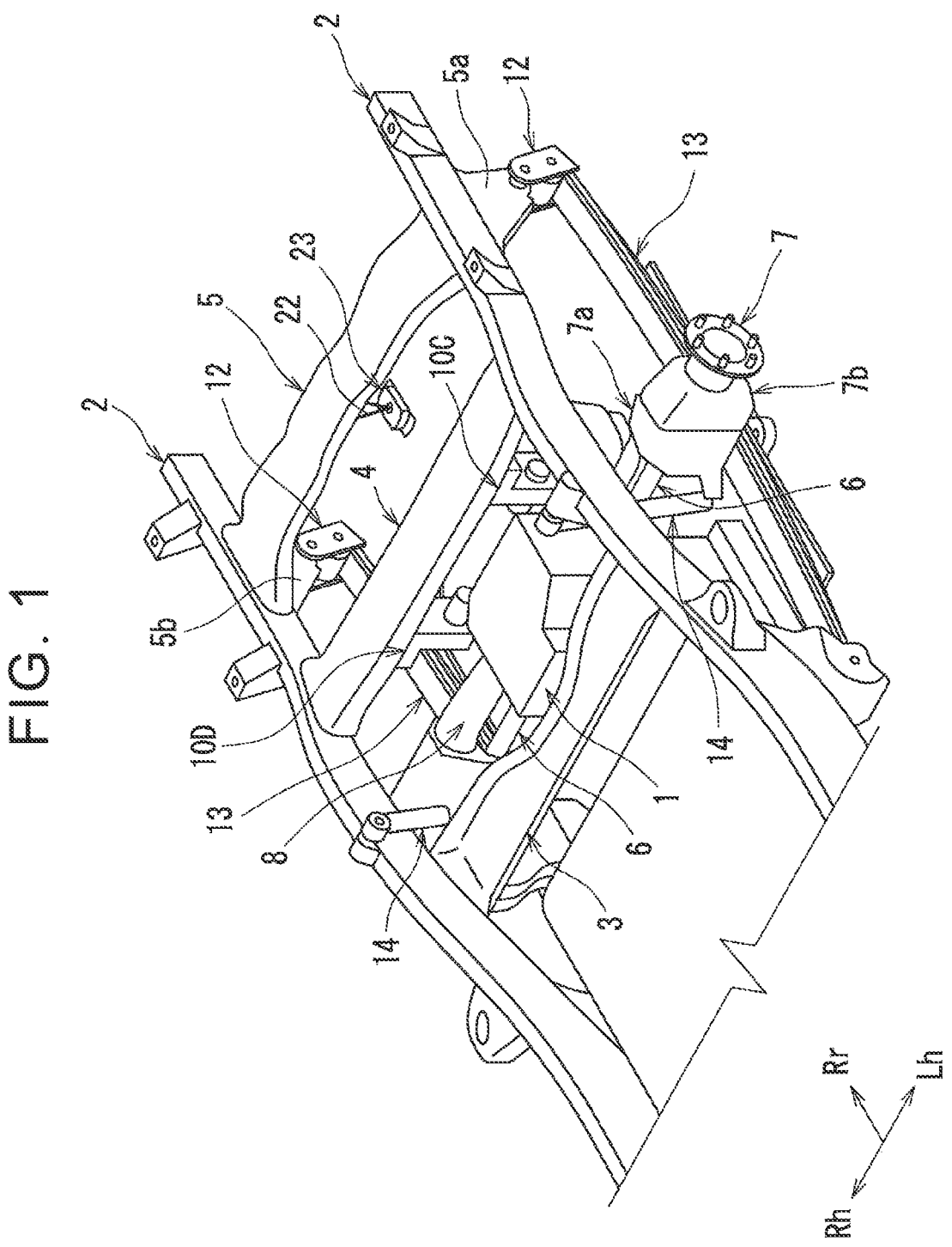
FIG. 1 is a top perspective view of an embodiment of a vehicle rear structure according to the present disclosure.
Figure 2:
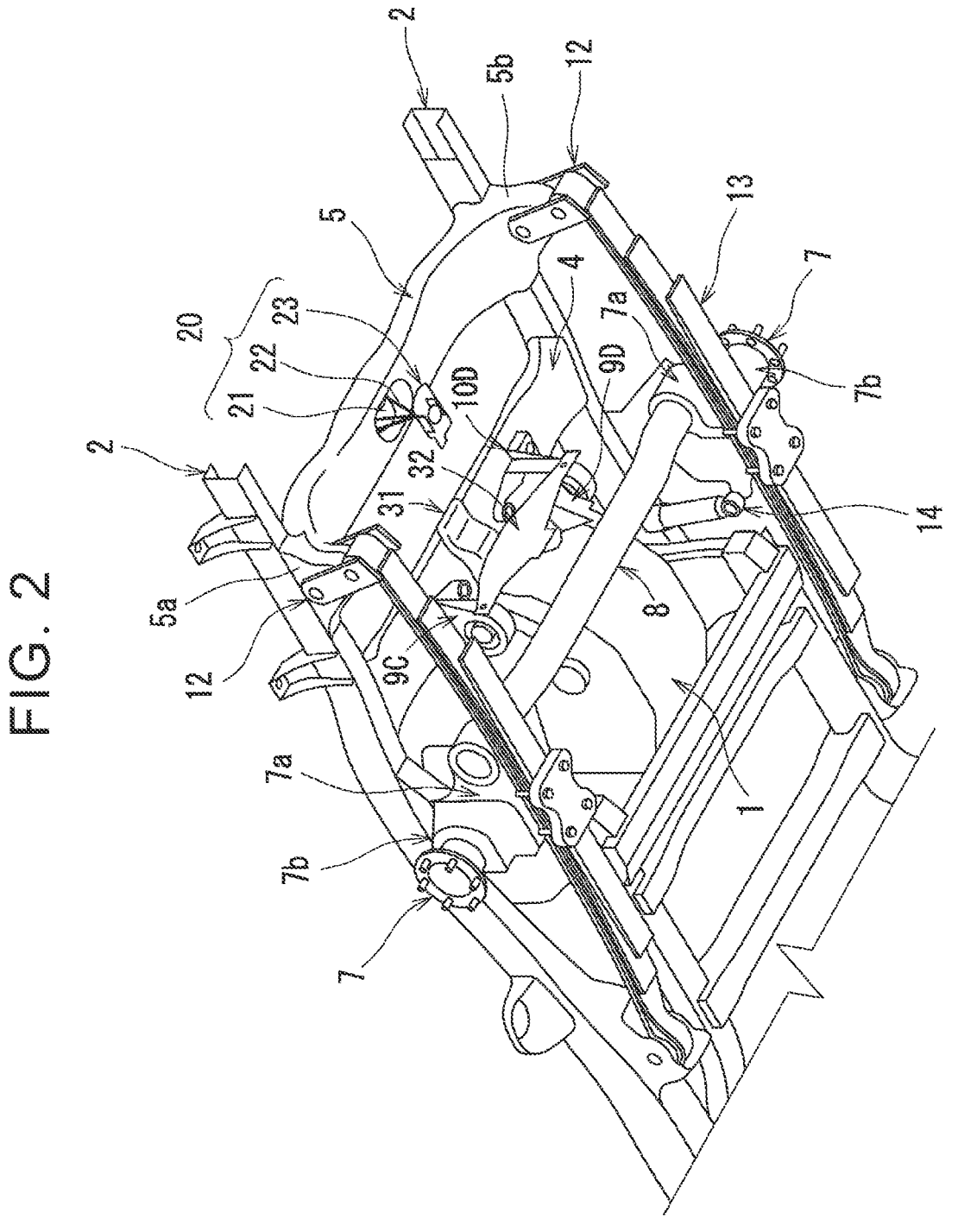
FIG. 2 is a bottom perspective view of the vehicle rear structure before the spare tire is installed.
Figure 6:
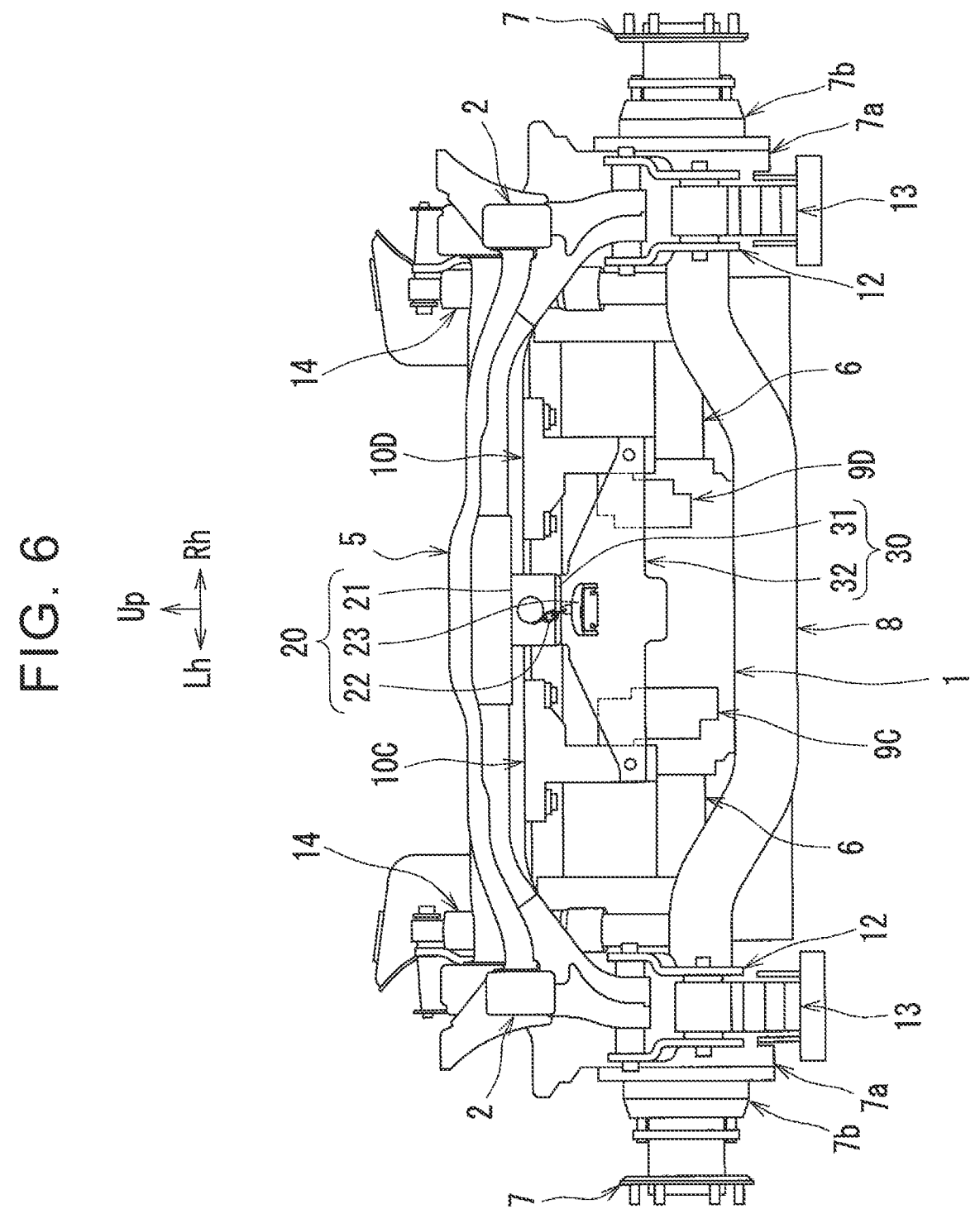
FIG. 6 is a view of the vehicle rear structure as seen from the rear side.

The lifting device 20 supports and lifts or lowers the spare tire 11, and is a known chain winding mechanism as shown in FIGS. 2 and 6, for example.

The lifting device 20 is attached to the middle of the third cross member 5 in the longitudinal direction via a base 21, and the holder 23 provided at the tip of the chain 22 is hooked to the center hole of the wheel 11a of the spare tire 11. It's becoming Then, as shown in FIG. 4A, the width of one end side and the other end side in the longitudinal direction of the second cross member 4 and the width of the bent portion on the one end side and the bent portion on the other end side of the third cross member 5 are It is set larger than the width of other parts. Each of the widths is a dimension along the vehicle front-rear direction.

This improves the rigidity of the connecting portion of the second cross member 4 and the third cross member 5 with respect to the side frame 2.

A lifting guide 30 is provided in the middle of the second cross member 4 in the longitudinal direction.

Figure 3:
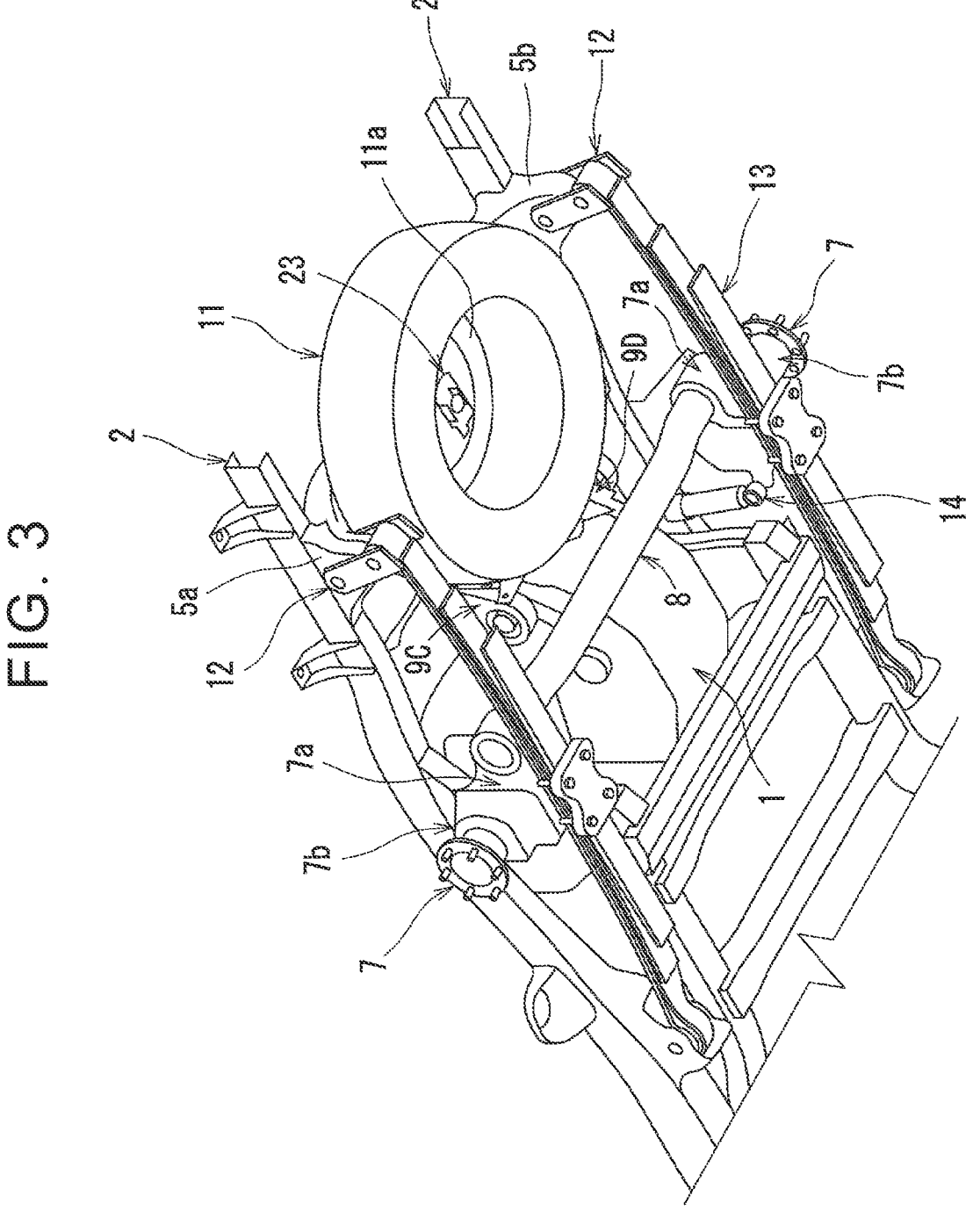
FIG. 3 is a perspective view showing a state in which a spare tire is attached in FIG. 2.

The lifting guide 30 guides the spare tire 11 so as to maintain its posture when the spare tire 11 is raised and lowered. For example, as shown in FIGS. 3 and 6, the lifting guide 30 is configured by combining a first guide bracket 31 and a second guide bracket 32.

The first guide bracket 31 is a block elongated in the vehicle front-rear direction in a plan view, and is fixed to the lower surface of the second cross member 4 at the center position in the longitudinal direction.

The lower rear portion of the first guide bracket 31 is formed into a curved surface that follows the rounded shape of the upper front shoulder of the spare tire 11 in the laterally placed posture with the front lowered as shown in FIG. 5A. The first guide bracket 31 is arranged at a position such that the upper front shoulder of the spare tire 11 comes into contact with the lower rear curved surface when the spare tire 11 is raised.

The second guide bracket 32 is a plate-like member elongated in the right-left direction of the vehicle when viewed from above, an middle of the second guide bracket 32 is fixed to a front end of the first guide bracket 31, and one end and the other end of the second guide bracket 32 in the longitudinal direction are fixed to the right and left rear brackets 10D and 10C of the second cross member 4.

The rear portion of the second guide bracket 32 is formed into a flat surface that follows the shape of the outer peripheral surface of the spare tire 11 in the laterally placed posture with the front side lowered as shown in FIG. 5A. The second guide bracket 32 is arranged at a position such that the front of the outer peripheral surface of the spare tire 11 contacts the rear flat surface when the spare tire 11 is raised.

The flat surface of the rear portion of the second guide bracket 32 is positioned substantially at the same position as the rear edge of the De Dion tube 8 in the longitudinal direction of the vehicle.

Since the second guide bracket 32 is fixed to the rear brackets 10C and 10D in this way, the rigidity of the second cross member 4 is improved.

As described above, in the embodiment to which the present disclosure is applied, the second cross member 4 for supporting the motor 1 and the third cross member 5 for supporting the spare tire 11 are installed at the rear portion of the vehicle frame, the motor 1 and the spare tire 11 are arranged in the vehicle longitudinal direction under the rear frame of the vehicle, and the rear part of the leaf spring 13 is attached to the third cross member 5.

According to such a configuration, the rigidity of the rear portion of the vehicle frame is improved compared to the conventional example in which the motor is supported under the rear portion of the vehicle frame and the spare tire is mounted on the floor panel.

As a result, the support rigidity of the load input from the right and left rear wheels (not shown) and the torsional rigidity of the rear part of the vehicle are improved, so that the NV characteristics can be reduced and the function of the leaf spring 13 is improved. It becomes possible to demonstrate stably, and it becomes possible to improve the maneuverability.

Further, in the above embodiment, even when the carriage 40 collides with the rear part of the vehicle and enter the lower portion of the rear portion of the side frame 2 as shown in FIG. 5A, the carriage 40 is received by the spare tire 11, each projecting portion 5a, 5b of the third cross member 5, and the shackles 12.

This makes it possible to suppress or prevent the carriage 40 from entering the lower side of the side frame 2. Even when another vehicle collides with the rear portion of the vehicle, it is possible to suppress or prevent the other vehicle from entering the lower portion of the rear portion of the side frame 2 in the same manner as described above.

Further, the operation when the spare tire 11 is attached and detached will be described.

First, in the process of lowering the spare tire 11 by the lifting device 20 to remove it from the third cross member 5, because the front end of the spare tire 11 is in contact with the lifting guide 30, the spare tire 11 is guided by the lifting guide 30 while maintaining the horizontal position with the front lowered, as indicated by the chain double-dashed line in FIG. 5B. This makes it possible to suppress or avoid interference of the spare tire 11 with the motor 1 and surroundings (rear brackets 10C, 10D, etc.) of the motor 1 due to the spare tire 11 swinging during the descent process.

On the other hand, in the process of lifting the spare tire 11 to attach it to the third cross member 5 by the lifting device 20, the spare tire 11 is lifted up in a horizontal lateral position. However, when the spare tire 11 is lifted to a predetermined height, the front end of the spare tire 11 comes into contact with the lifting guide 30, and the lifting guide 30 guides the spare tire 11 to be pulled up while tilting forward and downward. This makes it possible to suppress or avoid interference of the spare tire 11 with the motor 1 and surroundings (rear brackets 10C, 10D, etc.) of the motor 1 due to the spare tire 11 swinging during the ascending process.

Even if the upper and lower front shoulders of the spare tire 11 in the laterally placed posture with the front lowered interferes with the De Dion tube 8 when the spare tire 11 is lifted and lowered, the roundness of the shoulders does not interfere with the circular outer peripheral surface of the De Dion tube 8. Since the spare tire 11 comes into contact with and is smoothly guided, the attitude of the spare tire 11 is less likely to be greatly disturbed.

In this way, it is possible to stably and smoothly perform the work of removing (lowering) and mounting (lifting) the spare tire 11, thereby ensuring safety.

The disclosure is not limited to the foregoing embodiment. The technical scope of the disclosure is defined by claims, and all changes that come within the meaning and range of equivalency of the claims are therefore intended to be embraced therein.

In the above embodiment, the rear part of the motor 1 is supported by the second cross member 4 via two rear motor mounts 9C, 9D and two rear brackets 10C, 10D. It is not limited.

For example, although not shown, the rear portion of the motor 1 may be supported by the second cross member 4 via one rear motor mount and one rear bracket. In the case of such an embodiment as well, the same actions and effects as those of the above-described embodiment can be obtained.

In the above embodiment, an example using the De Dion tube 8 is given, but the present disclosure is not limited to this. For example, although not shown in the drawings, an embodiment in which the De Dion tube 8 is not used is possible.

The present disclosure can be suitably used for a vehicle rear structure.

What is claimed is:

1. A vehicle rear structure in which a motor that generates a driving force is supported under a rear portion of a frame of a vehicle, and a spare tire is supported behind the motor in a vehicle front-rear direction, wherein:

the frame includes a pair of right and left side frames extending in the vehicle front-rear direction, a front cross member that is connected to rear portions of the side frames such that the front cross member spans along a vehicle right-left direction and supports a rear portion of the motor, and a rear cross member that is connected to portions of the side frames such that the rear cross member spans along the vehicle right-left direction behind the front cross member in the vehicle front-rear direction and detachably supports the spare tire; and the rear cross member is inverted U-shaped, is provided with a support device for the spare tire in a middle of the rear cross member in a longitudinal direction of the rear cross member, and is provided with attachment portions to each of which a rear end of a leaf spring is attached, the attachment portions being provided in one end side and another end side of the rear cross member in the longitudinal direction.

2. The vehicle rear structure according to claim 1, wherein:

the one end side and the other end side of the rear cross member in the longitudinal direction are bent such that the one end side and the other end side protrude below the respective side frames; and the attachment portions are configured to include protruding portions on the one end side and the other end side of the rear cross member, and shackles attached to the respective protruding portions.

3. The vehicle rear structure according to claim 1, wherein a width of each of one end side and another end side of the front cross member in an longitudinal direction of the front cross member is set to be larger than a width of the other portion of the front cross member, and a width of each of a bent portion on the one end side and a bent portion on the other end side of the rear cross member is set to be larger than a width of the other portion of the rear cross member.

* * * * *